J. E. CARVER.
Coffee Cleaner.

No. 105,643.                    Patented July 26, 1870.

Witnesses:
G. M. Ackerman
James H. Hunter

Inventor:
Joseph Eleazer Carver
per A. R. Haight Atty

United States Patent Office.

JOSEPH ELEAZER CARVER, OF BRIDGEWATER, MASSACHUSETTS, ASSIGNOR TO HENRY T. PRATT AND JOHN C. ALDEN, OF SAME PLACE.

Letters Patent No. 105,643, dated July 26, 1870.

IMPROVEMENT IN HULLING-MACHINES.

The Schedule referred to in these Letters Patent and making part of the same

*To all whom it may concern:*

Be it known that I, JOSEPH ELEAZER CARVER, of Bridgewater, in the county of Plymouth and State of Massachusetts, have invented a new and improved Machine for Hulling Coffee and Rice; and I do hereby declare that the following is a full, clear, and exact description of the same, reference being had to the accompanying drawing and to the letters of reference marked thereon, making a part of this specification.

This invention relates to that class of machines for hulling coffee and rice in which a rotary cylinder and stationary concave are employed.

The object of the invention is to obtain a machine for the purpose specified, which will not become choked or clogged while in operation, not injure the article being operated upon, especially the coffee, by breaking or grinding up the hulls of the same.

My invention is more especially designed for hulling coffee, for which many machines have been devised, the most common of which consists of two metallic abrading surfaces, between which the coffee is passed.

In some of these machines the abrading surfaces have been retained equidistant, a space being allowed between them just sufficient to admit of the decorticated coffee-beans to pass through without injury, but in most of them one or both of the surfaces are made yielding, having a fixed pressure, by means of a spring, or otherwise, in order to operate on beans of unequal size.

The devices for giving motion to the surfaces have been various. Disks have been used, one or both of which would revolve, and cylinders revolving in a concave, which is concentric with its axis, have also been employed.

Planes having toothed or corrugated surfaces have also been used for the purpose of hulling coffee, and arranged so as to have a progressive or a reciprocating motion, the coffee being held against the planes or corrugated surfaces by springs or pads, or pressure-plates, and double planes have been used, one having a motion in one direction, and the other a cross motion or reverse to that of the first, one or both planes being made with yielding surfaces.

It is evident that the cylinder machines have one advantage over all others mentioned, from the fact that the friction is nearly all thrown upon the bearings of the cylinder, but these machines have hitherto been less successful than the others, except under extremely complicated conditions.

The object of my invention is to improve the cylinder machine, and I can best describe how I effect this object by alluding briefly to the difficulties attending the operation of the ordinary cylinder machines.

A cylinder with a fixed or unyielding surface, revolving in a concave, which is also fixed and concentric, would of course only operate on coffee-beans of uniform dimensions.

To avoid this difficulty, the concave has been made yielding in very many ways, but all having one fatal objection.

The yielding concave has been made in sections or parts, invariably so, and these sections or parts having each a separate yielding movement, one portion or section will recede and increase the distance between it and the cylinder, either by the passage of a large bean or bunch of beans, or a stone, and the tendency of the coffee is to pack at that point, particularly if it is at the lower part of the cylinder, so that the coffee, by its own gravity, may fall or roll into the cavity thus created. The consequence of this packing is that the beans cease to roll for a moment, and, being held stationary while the cylinder is revolving, are broken or abraded.

Cylinders and cones made of some yielding substance, like India rubber, have also been used.

My machine consists of a cylinder, rotating in fixed bearings, and a fixed concave, the concave being a half circle or less, and made in one or more pieces, secured in a position concentric with the cylinder, and at such a distance from it that a single bean of unhulled coffee will be held in place without slipping between them, and being thus held it will be seen that when the cylinder is revolved, the bean will also be revolved, and at the same time carried around with it, but at a speed less than that of the cylinder. This rotary motion is of great importance, as it prevents the packing of the beans, and no portion of the surface of the bean is held in one place long enough to be injured.

It is of little consequence whether the body of the cylinder be smooth or roughened; either surface will operate well.

The cylinder is made with openings extending the whole length of its milling-surface. There may be ten of them in a cylinder of fifteen inches in diameter, that is to say, ten rows of openings. These openings are filled by roughened pressure-plates, which have the same curvature as the cylinder, as will be hereinafter more fully described. The effect is to subject the coffee to a constant rolling motion, under pressure, and not to grind or cut it. The hull soon yields to this treatment, and when sufficiently crushed, the bean will slip out of it.

When hulled, some of the beans are carried along upon the solid portion of the cylinder, and some continue to be revolved, but are not injured.

The number of rows of pressure-plates depends on the diameter of the cylinder, one inch space being allowed between the rows. The number of plates in each row depends on the length of the cylinder, the plates being placed as closely together in the rows as possible and not bind.

In the accompanying drawing—

Similar letters of reference indicate corresponding parts in the two figures.

Figure 1:
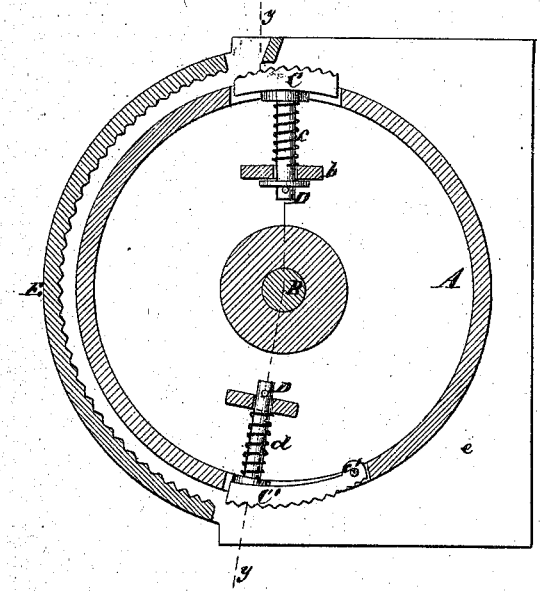
Figure 1 is a section of my invention, taken in the line $x\ x$, fig. 2.
Figure 2:
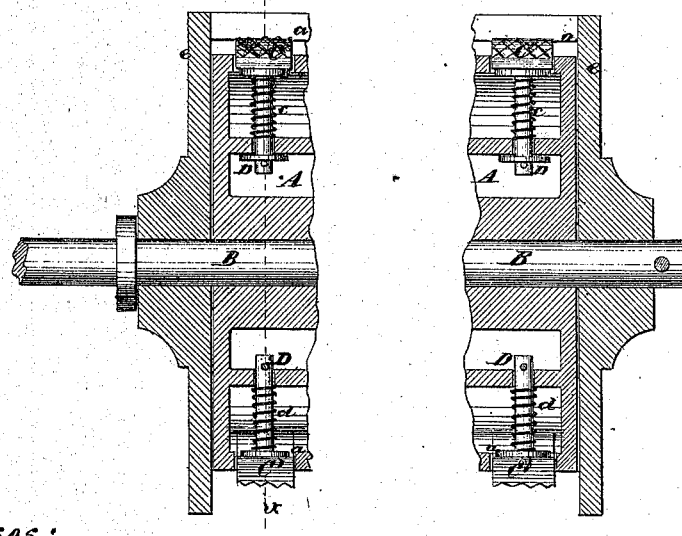
Figure 2 is also a section, taken the line $y\ y$, fig. 1.

A represents a hollow cylinder, fitted on a shaft, B, the latter being allowed to turn freely in its bearings.

The periphery of the cylinder is pierced or cast with a series of holes, $a$, in which corrugated or toothed plates, C C', are fitted. These plates, which are pressure-plates, may be of cast iron or steel, and the cylinder A may be of cast iron.

The plate C is attached to a rod, D, which is allowed to slide freely in a bearing, $b$, and has a spiral spring, $c$, upon it, which has a tendency to keep the plate C thrust outward to its fullest extent.

The other pressure-plate C' operates substantially in the same way, but the latter is pivoted at one end, as shown at $c'$, and has a spiral spring, $d$, bearing against its inner side, as shown clearly in both figures. I prefer, however, the arrangement as shown applied to plate C'.

E is a semi-annular concave, which extends about half way round the cylinder A, and is toothed or corrugated at its inner side.

This concave is concentric with the cylinder, and may be composed of sections bolted to plates $e$, one at each side of the cylinder, said concave being fixed or stationary.

F is an opening for a hopper, which conducts the unhulled coffee down between the concave and cylinder.

It is designed in practice to have a space of about one inch in length between the ends of the pressure-plates, and to have the latter but slightly exceed in width the length of a coffee-bean, say about half an inch. By this means the beans are allowed to adjust themselves, and turn freely between the concave and pressure-plates as the cylinder rotates.

The object in allowing spaces between the ends of the pressure-plates is to admit of the dropping of the unhulled beans between the ends of the same, a freedom of adjustment being thereby allowed the beans, which greatly favors the stripping of the hulls from the former.

The springs $c\ d$ give the requisite degree of pressure to the plates C C' to insure the splitting of the hulls, and the detachment of the same from the beans without grinding or breaking up the hulls, the object being to avoid this, so that there will be no dust or powder to contend with, and also to prevent injury to the beans by abrasion.

This machine, although it does not seem to differ at first sight, or by a superficial observation, very materially from many other rotary machines of the same class and for the same purpose, still it effects very important results not attained by others, to wit, the beans are subjected to a rotation as the cylinder turns, and this rotation of the beans is independent of the rotation of the cylinder, so far as regards the carrying around of the beans with the cylinder, the latter having full power to adjust themselves, and be deprived of their hulls without being crushed or abraded, as would be the case were there any recesses in the periphery of the cylinder for the beans to lodge and be carried around with it, the beans having two motions, one with the cylinder, but slower than it, and another motion, which is a rotary one, on their own axes. These two motions insure the desired result, previously alluded to, and said result is favored by having an unbroken concave, for that also has no recesses in which the beans can collect or lodge and be subjected to unnecessary abrasion and crushed.

It is designed in practice to have several longitudinal rows of pressure-plates across the cylinder, the number of rows corresponding of course to its diameter, and the number of plates in each row corresponding to its length.

I am aware that spring pressure-plates, arranged in the rotating cylinder of machines for shelling corn, have been used, but these have been different in construction from mine, and such I do not claim; but

Having thus described my invention,

What I claim as new, and desire to secure by Letters Patent, is—

The improved hulling-machine herein described, consisting of the hollow rotary cylinder A, provided with the hinged spring pressure-plates C', constructed as described, and arranged to operate in conjunction with the fixed semi-annular concave E, substantially in the manner and for the purpose set forth.

JOSEPH ELEAZER CARVER.

Witnesses:
  A. R. HAIGHT,
  G. M. ACKERMAN.